United States Patent
Liu et al.

(10) Patent No.: US 10,615,982 B2
(45) Date of Patent: Apr. 7, 2020

(54) METHOD AND DEVICE FOR PROVIDING A KEY FOR INTERNET OF THINGS (IOT) COMMUNICATION

(71) Applicant: Futurewei Technologies, Inc., Plano, TX (US)

(72) Inventors: Yan Liu, Shenzhen (CN); Xiaobo Wang, Santa Clara, CA (US)

(73) Assignee: Futurewei Technologies, Inc., Plano, TX (US)

(*) Notice: Subject to any disclaimer, the term of this patent is extended or adjusted under 35 U.S.C. 154(b) by 563 days.

(21) Appl. No.: 15/401,992

(22) Filed: Jan. 9, 2017

(65) Prior Publication Data
US 2018/0054315 A1 Feb. 22, 2018

Related U.S. Application Data

(60) Provisional application No. 62/377,420, filed on Aug. 19, 2016.

(51) Int. Cl.
H04L 9/32 (2006.01)
H04L 9/08 (2006.01)
(Continued)

(52) U.S. Cl.
CPC .......... *H04L 9/3242* (2013.01); *H04B 10/116* (2013.01); *H04L 9/0643* (2013.01);
(Continued)

(58) Field of Classification Search
CPC ....... G06F 21/34; G06F 21/35; H04B 10/116; H04W 12/003; H04W 12/02; H04W 12/04; H04W 12/0401; H04W 12/06; H04W 12/10; H04L 2209/805; H04L 2463/061; H04L 63/0428; H04L 63/0435; H04L 63/061; H04L 63/123; H04L 63/18; H04L 9/0643; H04L 9/0827; H04L 9/0861; H04L 9/0869; H04L 9/14; H04L 9/3242

See application file for complete search history.

(56) References Cited

U.S. PATENT DOCUMENTS

2008/0209305 A1  8/2008  Sato
2014/0072119 A1*  3/2014  Hranilovic ............ H04L 9/3215
                                              380/270
(Continued)

FOREIGN PATENT DOCUMENTS

CN  102983961 A  3/2013
CN  103906054 A  7/2014
(Continued)

OTHER PUBLICATIONS

Gustavus Simmons, Contemporary Cryptology, IEEE Press, New York, p. 384-385 (IEEE 1992) (Year: 1992).*

(Continued)

*Primary Examiner* — Theodore C Parsons
(74) *Attorney, Agent, or Firm* — Slater Matsil, LLP

(57) ABSTRACT

A method and device for providing a key for IoT communication are disclosed. The method includes an embodiment whereby an IoT device modulates a light signal carrying a security code to generate a modulated light signal, emits the modulated light signal to a personal electronic device, derives a security key from the security code, and performs authentication with a control device based on the security key.

26 Claims, 16 Drawing Sheets

(51) Int. Cl.
  *H04B 10/116* (2013.01)
  *H04L 9/06* (2006.01)
  *H04L 9/14* (2006.01)
  *H04L 29/06* (2006.01)
  *H04W 12/02* (2009.01)
  *H04W 12/04* (2009.01)
  *H04W 12/10* (2009.01)

(52) U.S. Cl.
  CPC .......... *H04L 9/0827* (2013.01); *H04L 9/0861* (2013.01); *H04L 9/0869* (2013.01); *H04L 9/14* (2013.01); *H04L 63/0428* (2013.01); *H04L 63/0435* (2013.01); *H04L 63/061* (2013.01); *H04L 63/123* (2013.01); *H04W 12/02* (2013.01); *H04W 12/04* (2013.01); *H04W 12/10* (2013.01); *H04L 2209/805* (2013.01); *H04L 2463/061* (2013.01)

(56) References Cited

U.S. PATENT DOCUMENTS

| | | |
|---|---|---|
| 2014/0156989 A1 | 6/2014 | Lalwani et al. |
| 2014/0192185 A1* | 7/2014 | Oshima ................. H04B 10/11 348/135 |
| 2015/0155936 A1 | 6/2015 | Liu et al. |
| 2015/0319144 A1 | 11/2015 | Barton et al. |
| 2016/0180100 A1 | 6/2016 | Britt et al. |
| 2016/0226845 A1 | 8/2016 | Kim et al. |
| 2016/0294828 A1* | 10/2016 | Zakaria ................... H04W 4/70 |
| 2017/0171747 A1* | 6/2017 | Britt ....................... H04W 12/04 |
| 2017/0195318 A1* | 7/2017 | Liu ......................... H04W 12/06 |
| 2017/0264597 A1 | 9/2017 | Pizot et al. |
| 2018/0054315 A1 | 2/2018 | Liu et al. |
| 2018/0091506 A1* | 3/2018 | Chow ................. H04L 67/2838 |

FOREIGN PATENT DOCUMENTS

| | | |
|---|---|---|
| CN | 105162772 A | 12/2015 |
| WO | 2016114604 A1 | 7/2016 |

OTHER PUBLICATIONS

S. Rajagopal, R. D. Roberts and S. Lim, "IEEE 802.15.7 visible light communication: modulation schemes and dimming support," in IEEE Communications Magazine, vol. 50, No. 3, pp. 72-82, Mar. 2012. (Year: 2012).*

* cited by examiner

METHOD AND DEVICE FOR PROVIDING A KEY FOR INTERNET OF THINGS (IOT) COMMUNICATION

The present application claims priority to U.S. Provisional Patent Application No. 62/377,420, filed Aug. 19, 2016 and entitled "Internet of Things Device Security," which is incorporated herein by reference as if reproduced in its entirety.

TECHNICAL FIELD

The present disclosure generally relates to Internet of Things (IoT) communication.

BACKGROUND

IoT is the next big trend for the IT industry, and has become a powerful force for business transformation. IoT aims at transforming the way we perceive connected devices, enabling day-to-day objects to connect to the internet and share data.

An IoT network is a network of IoT devices or physical objects that contain embedded technology, wherein IoT devices are capable of communicating, sensing, or interacting with their internal states or the external environment. Via the IoT network, the IoT devices or physical objects can be readable, recognizable, locatable, addressable, and controllable. There are various applications for IoT devices. These applications extend from smart connected homes, to wearables, to healthcare devices. However, as more and more IoT devices are connected, security concerns rise for the IoT devices.

SUMMARY

In one embodiment, a method for for providing a key for IoT communication is disclosed that includes modulating, by an IoT device, a light signal carrying a security code to generate a modulated light signal, emitting, by the IoT device, the modulated light signal to a personal electronic device, deriving, by the IoT device, a security key from the security code, and performing, by the IoT device, authentication with a control device based on the security key.

In another embodiment, an IoT device is disclosed that includes a memory storage comprising instructions, one or more processors in communication with the memory, and a light communication component that emits the modulated light signal to a personal electronic device. In one embodiment, the one or more processors execute the instructions to modulate a light signal carrying a security code to generate a modulated light signal, derive a security key from the security code, and perform authentication with a control device based on the security key.

In yet another embodiment, a non-transitory computer-readable medium storing computer instructions for providing a key for internet of things (IoT) communication is disclosed. In one embodiment, when executed by one or more processors the computer instructions cause the one or more processors to perform the steps of receiving a modulated light signal carrying a security code from an IoT device to generate a modulated light signal, demodulating the modulated light signal to retrieve the security code, deriving a security key from the retrieved security code, and sending to a control device the security key for authentication.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that, although an illustrative implementation of one or more embodiments are provided below, the disclosed systems, apparatuses, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, applicants in no way disclaim these technical aspects, and it is contemplated that the present disclosure may encompass one or more of the conventional technical aspects discussed herein.

Figure 1:
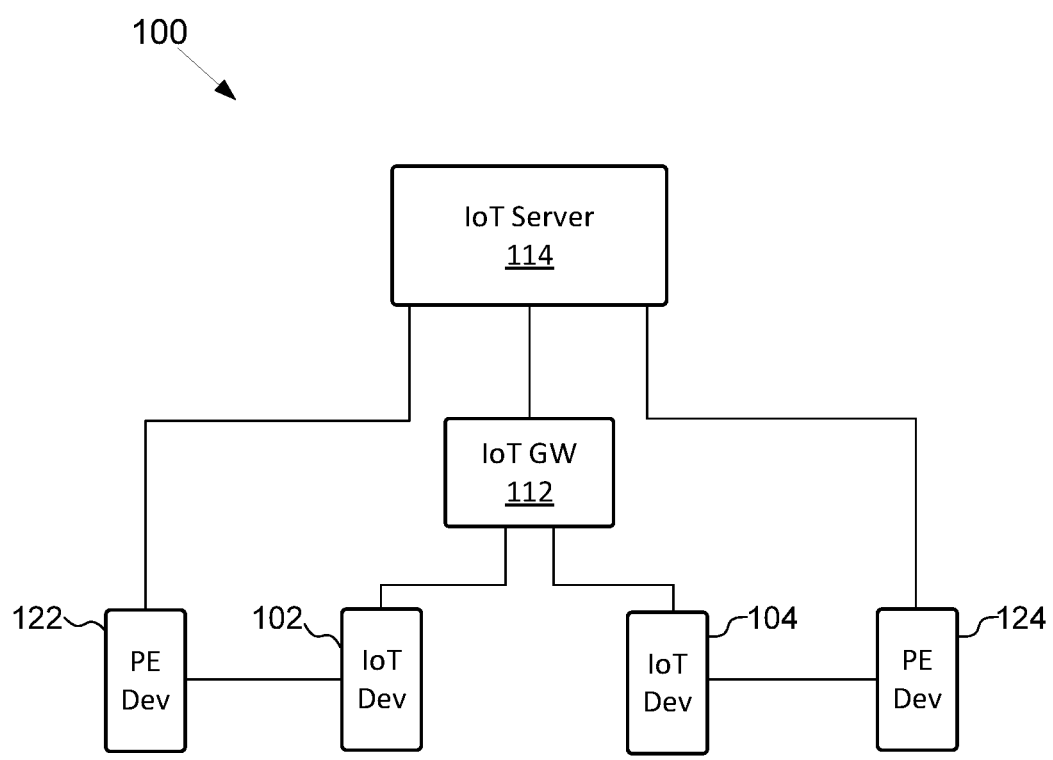
FIG. 1 is a schematic diagram of an embodiment of an IoT system.

FIG. 1 is a schematic diagram of an embodiment of an IoT system 100 for use in various embodiments of the disclosed systems and methods. The IoT system 100 may comprise an IoT server 114, an IoT gateway (IoT GW) 112 and a plurality of IoT devices, which include an IoT device (IoT Dev) 102 and an IoT device (IoT Dev) 104. The IoT device 102 and IoT device 104 are connected to the IoT gateway 112 via wired or wireless connections. The IoT gateway 112 is connected to the IoT server 114 via a data network, such as the Internet. The IoT gateway 112 enables the IoT devices 102-104 to communicate with the IoT server 114. In addition, a personal electronic device (PE Dev) 122 and personal electronic device (PE Dev) 124 may communicate with the IoT device 102 and the IoT device 104 to exchange information. While two (2) IoT devices are shown in FIG. 1, it is expressly contemplated that any number of these devices may be found in a system, and the selection of two is purely for the purpose of convenience. Moreover, it is understood that alternate configurations are contemplated by this disclosure, e.g., where a personal electronic device may communicate with a plurality of IoT devices 102-104.

The IoT devices 102-104 are configured to transmit information to one or more other devices in an IoT system over a wired or wireless connection. The IoT devices 102-104 each may include a communication component, such as a modem, a transceiver, a transmitter-receiver, a light communication component, or the like. The light communication component, for example, may be a light emitting component. In some implementations, the light emitting component includes a light bulb, a Light Emitting Diode (LED), laser, or other suitable component that emits light. With the communication component, the IoT devices 102-104 each may communicate over a wire or wireless connection, including electromagnetic signals, optical signals, sound signals, or other suitable signals for communication.

In some implementations, the IoT devices 102-104 may not include WiFi capability, but might use low power and short range communication protocols, such as ZigBee, Z-Wave, Bluetooth, Bluetooth Low Energy, Visible Light Communication (VLC) or the like, to relay data to other devices used for data gathering from deployed IoT devices. In some implementations, the IoT devices 102-104 each may include one or more sensors which are used for measuring, or monitoring, or a combination of measuring and monitoring a physical quantity with respect to their internal states or the external environment. In some implementations, the IoT devices 102-104 each may include a processor and memory, might have limited input/output (I/O) capabilities. For example, the IoT devices 102-104 each may have a visual display or other output device.

It is understood that the communication between the IoT device and the other device in the IoT system may be protected using various technologies. For example, integrity of a message exchanged between the IoT device and the other device may be protected with an integrity key, by allowing verifiers to detect any changes to the message content. In another example, confidentiality of a message exchanged between the IoT device and the other device may be protected with one or more encryption keys, by transforming information (referred to as plaintext) to make it unreadable to anyone except those possessing the one or more encryption keys.

In some implementations, as the IoT devices 102-104 usually include limited communication capability, the IoT devices 102-104 sometimes have no routable connectivity to the Internet. In some implementations, as the IoT devices 102-104 are limited on characteristics such as available power, memory or processing resources often due to cost constraints or physical constraints, the IoT devices 102-104 may have no available power or resources to perform required transmission via the Internet. Thus the IoT gateway 112 may be provided to connect to the IoT devices 102-104 and communicate via specific protocols, store and parse information from the IoT devices 102-104 and then via the Internet send the information over to the IoT Server 114 for processing and analytics. To connect the IoT devices 102-104, the IoT gateway 112 may include either hard-wired interfaces, such as Serial Peripheral Interface (SPI), Universal Serial Bus (USB), etc., or wireless interfaces, such as radio frequency identification (RFID), ZigBee, Bluetooth, Bluetooth Low Energy, Wi-Fi, Near Field Communication (NFC), Z-Wave, VLC, etc.

As the IoT devices 102-104 may use different transmission protocol from that used in the IoT Server 114, the IoT gateway 112 acts as a bridge between the IoT devices 102-104 and the IoT Server 114. The IoT gateway 112 may be responsible for protocol translation and other interoperability tasks. Specifically, the IoT gateway 112 is employed to provide the connection and translation between the IoT devices 102-104 and the IoT Server 114.

In some implementations, the IoT gateway 112 can cache data received from multiple IoT devices 102-104 and transmit the data in aggregate to the IoT Server 114 in order to conserve network resources. In some implementations, the IoT gateway 112 may transmit the data gathered from the IoT devices 102-104 to the IoT Server 114 only when it is requested, or may transmit the data at a specified time. In some implementations, the IoT gateway 112 can also filter the data that is gathered from the IoT devices 102-104 and to be provided to the IoT Server 114, e.g. to reduce redundant data. In some implementations, the IoT gateway 112 may support security management function including authentication, encryption/decryption, or a combination thereof.

The IoT server 114 is configured to store, process, and analyze data gathered from the IoT devices 102-104. For example, the IoT server 114 may include application enablement, connection management, security management and data processing and analyzing functions, or subsets and variations thereof. The security management function may include authentication, encryption/decryption, or a combination thereof. In some implementations, the IoT server 114 can be implemented as a plurality of structurally separate servers, or alternately as a single server. In some implementations, the IoT server 114 can be integrated into an existing device or system. In some implementations, the IoT server 114 can be implemented in a form of a cloud server or a cloud platform.

Figure 2:
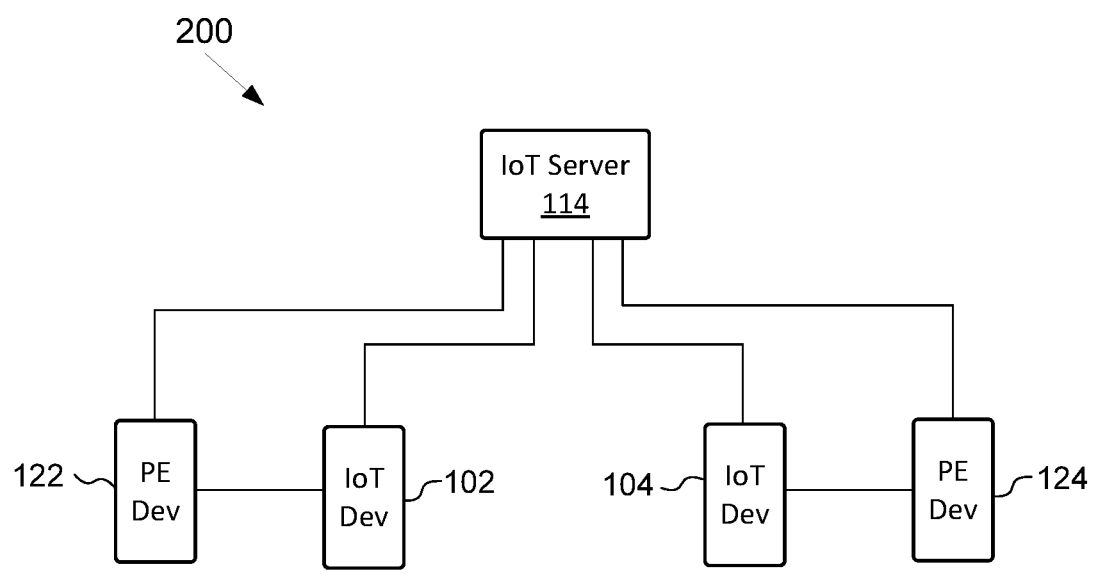
FIG. 2 is a schematic diagram of another embodiment of an IoT system.

It is expressly contemplated that the IoT devices 102-104 sometimes may have routable connectivity to the Internet. In regard to such IoT devices, FIG. 2 is a schematic diagram of another embodiment of an IoT system 200 for use in various embodiments of the disclosed systems and methods. The main difference between FIG. 2 and FIG. 1 lies in that the IoT devices 102-104 are connected to the IoT server 114 without using the IoT gateway 112. With regard to other aspects of FIG. 2, reference can be made to the above-mentioned embodiment of FIG. 1, for the sake of conciseness. Moreover, it is also understood that alternate configurations are contemplated by this disclosure, e.g., where some IoT devices may be connected to the IoT server without using the IoT gateway, other IoT devices may be connected to the IoT server through the IoT gateway in one IoT system.

Figure 3:
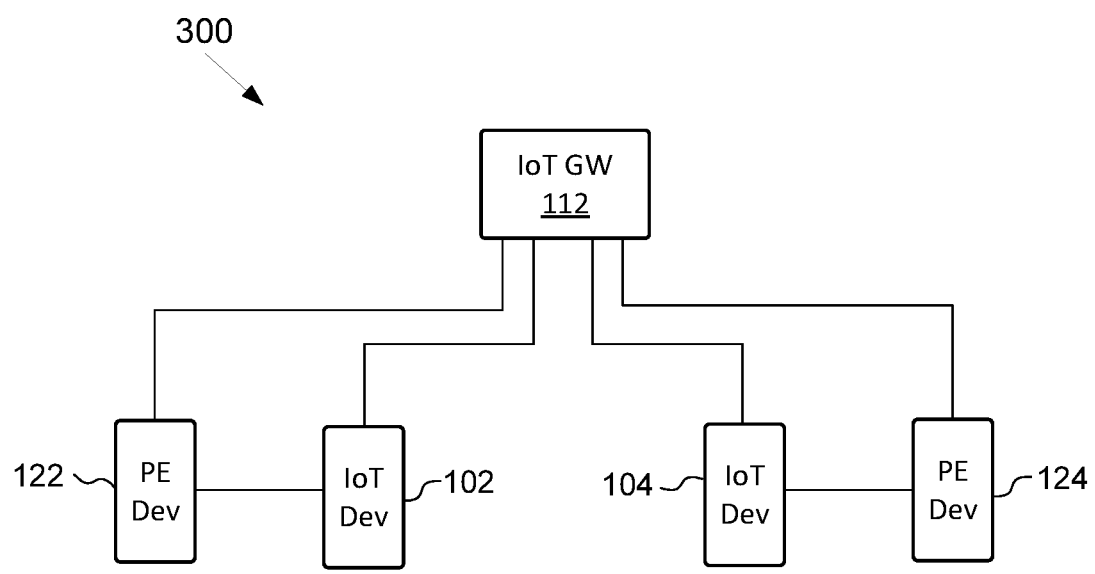
FIG. 3 is a schematic diagram of yet another embodiment of an IoT system.

It is also understood that the IoT gateway 112 alternatively may include parts of or all of IoT server functions. In regard to such IoT gateway, FIG. 3 is a schematic diagram of yet another embodiment of an IoT system 300 for use in various embodiments of the disclosed systems and methods. The main difference between FIG. 3 and FIG. 1 lies in that the IoT gateway 112 includes parts of or all of IoT server functions and thus the IoT server 114 is omitted. With regard to other aspects of FIG. 3, reference can be made to the above-mentioned embodiment of FIG. 1, for the sake of conciseness.

As used herein, the term "personal electronic device" may be also referred to as a "personal electronic device", "personal device", "trusted device", or "cellular phone". The personal electronic devices 122-124 may include, but are not limited to, cellular phone, smartphones, pagers, personal digital assistants (PDAs), desktop computers, tablet computers, laptop computers, etc., so long as the personal electronic devices 122-124 are equipped with communication capabilities for communicating with a device in the IoT system 100. The personal electronic devices 122-124 each may include a communication component, such as a modem, a transceiver, a transmitter-receiver, a light communication component, or the like. The light communication component, for example, may be a light emitting component. In some implementations, the light emitting component includes a light bulb, a LED, laser, or other suitable component that emits light. The personal electronic devices 122-124 each may communicate over a wire or wireless connection, including electromagnetic signals, optical signals, sound signals, or other suitable signals for communication. In some implementations, the personal electronic devices 122-124 each may include a processor and memory. In some implementations, The light communication component of each of the personal electronic devices 122-124 may be a light receiving component, such as a camera, light sensor or any other suitable device which is able to capture video, light or optical signaling, and optionally support these corresponding video, image and signaling analysis.

In some embodiments, the IoT devices 102 may send a security code to the personal electronic device 122 through a secure communication channel. Each of the personal electronic device 122 and the IoT device 102 derive a shared security key from the security code. Then the personal electronic device 122 sends the shared security key to the IoT server 114 via secured communication network, but not through the IoT network. By sending the shared security key via the separate communication network, a possibility that the shared security key being intercepted is therefore avoided. Thus the shared security key could be derived and transmitted in a secure way, where the eavesdropper cannot intercept the shared security key.

Figure 4:
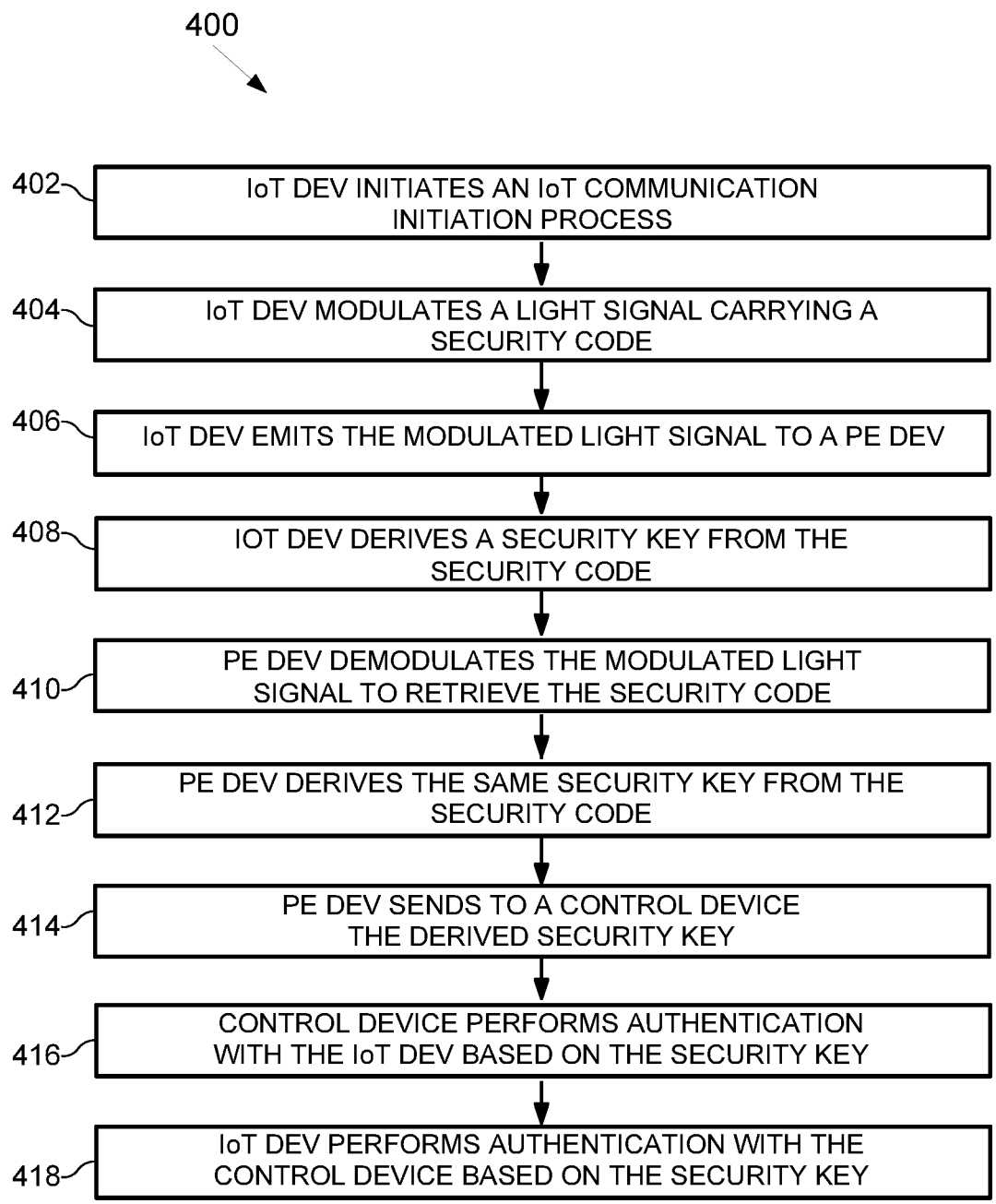
FIG. 4 is a flow diagram of an embodiment of a method for providing a key for IoT communication.

FIG. 4 is a flow diagram of another embodiment of a method 400 for providing a key for IoT communication. The embodiment method 400 may be implemented in the context of various embodiments of the disclosed IoT systems.

At step 402, an IoT device, such as the IoT device 102, initiates an IoT communication initiation or setup process in an IoT system.

At step 404, the IoT device modulates a light signal carrying a security code.

At step 406, the IoT device emits the modulated light signal to a personal electronic device, such as the personal electronic device 122, for transmitting the security code. For example, the modulated light signal may be outputted from an invisible light source or a visible light source of the IoT device.

At step 408, the IoT device derives a security key from the security code.

In some implementations, the security code comprises a random number, a pseudorandom number, a number generated in other suitable ways, or a root key.

It is expressly contemplated that any number of security keys may be derived from the security code.

At step 410, the personal electronic device demodulates or decodes the modulated light signal to retrieve the security code. For example, the personal electronic device performs light demodulation analysis and retrieves the security code, using its light receiving component, such as a camera or light sensor and special software loaded thereon.

In some embodiments, the personal electronic device may record the modulated light signal from the IoT device and send the recorded material to any external server in or outside the IoT system, with the external server performing the light signal demodulation analysis and returning the retrieved security code to the personal electronic device.

In some embodiments, the personal electronic device may record the modulated light signal from the IoT device and send the recorded material to a control device for performing the light signal demodulation analysis. The control device, for example, includes an IoT gateway, an IoT server or the combination thereof. Then the control device retrieves the security code and derives the same security key from the security code. If the control device performs the light signal demodulation analysis, there is no need to perform steps 412-414.

At step 412, the personal electronic device derives the same security key from the security code that has been derived by the IoT device.

At step 414, the personal electronic device sends to the control device the derived security key, for the control device to use in performing authentication with the IoT device.

At step 416, the control device performs authentication with the IoT device based on the security key.

At step 418, the IoT device performs authentication with the control device based on the security key. After a successful mutual authentication between the IoT device and the control device, the IoT communication initiation process may be finished. It is understood that such a mutual authentication is optional and in some embodiments only a single side authentication may be required for the IoT communication initiation process.

By transmitting the security code using a modulated light signal, no additional complex hardware is required for the IoT device or the personal electronic device. In addition, as the security code being transferred is not wirelessly transmitted via electromagnetic waves, it is difficult for eavesdroppers to obtain the security code. Thus the IoT communication based on the security code is established in an economical and secure way.

Figure 5:
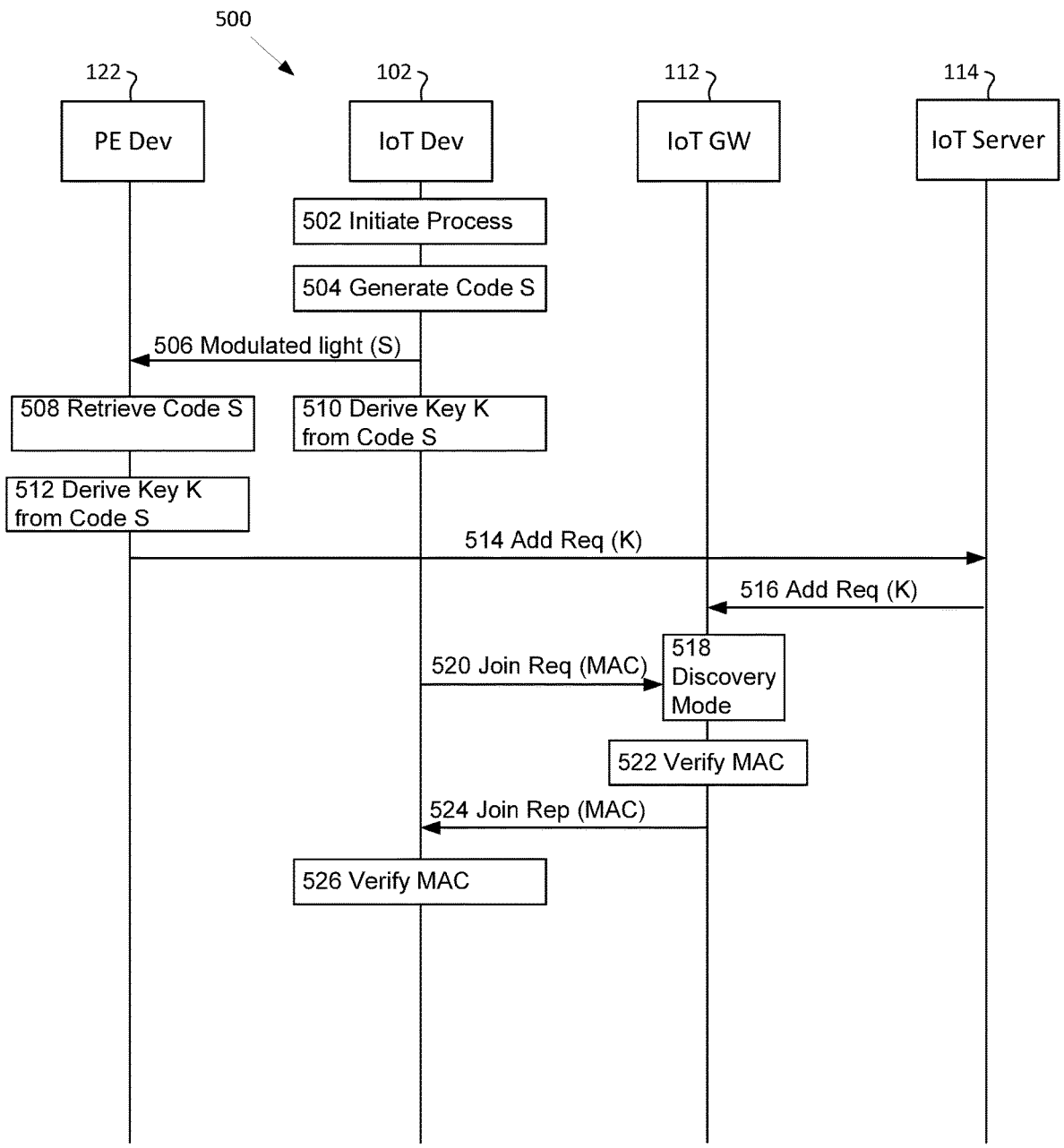
FIG. 5 is a flow diagram of another embodiment of a method for providing a key for IoT communication.

FIG. 5 is a flow diagram of another embodiment of a method 500 for providing a key for IoT communication. As an option, the embodiment method 500 may be implemented in the context of the IoT system 100 as illustrated in FIG. 1.

At step 502, an IoT device, such as the IoT device 102, initiates an IoT communication initiation or setup process in an IoT system, such as the IoT system 100.

In some implementations, the IoT device 102 may initiate in response to an input caused by pressing a button or combination of buttons of the IoT device 102. Alternatively, the input may be caused by manipulating some manner of suitable input device. In some implementations, the IoT device 102 may initiate when it attempts to perform communications or interact with an external device or network.

At step 504, the IoT device 102 generates an initial code S (i.e., security code) when the IoT communication initiation process is initiated. The initial code S, for example, comprises a random number, a pseudorandom number, a number generated in other suitable ways, or a root key.

In some implementations, the initial code S is inputted by a user. In some implementations, the initial code S is pre-stored within the IoT device 102. In some implementations, the initial code S is transferred to the IoT device 102 from an external device, such as a memory device or other external device that is coupled to the IoT device 102. In some implementations, a first software application loaded on the IoT device 102 generates the initial code S.

In some implementations, the initial code S is a one-time code that is only valid for one time of the IoT communication initiation process. For each time the IoT device 102 performs or attempts to perform an IoT communication initiation process, a new initial code S is generated. As a result, an eavesdropper cannot use a previously obtained initial code S for a subsequent initiation process operation. In some implementations, each initial code S may further include a valid time-to-live window, which may be pre-configured. Once the valid time-to-live window has expired, the corresponding initial code S becomes invalid. Thus a new initial code S is needed to re-setup IoT communication for the IoT system due to the expiration of a old initial code S.

At step 506, the IoT device 102 transmits the generated initial code S to a personal electronic device, such as the personal electronic device 122, using a modulated light signal which is outputted from a light source of the IoT device 102. The light signal is modulated according to the initial code S.

The light source, for example, includes a source of invisible light or a source of visible light. It is understood that in some implementations the IoT device 102 itself may be a light source, e.g., light bulb. In some implementations, the light source may be a visual display screen of the IoT device 102 that can show characters, texts, images or the combination thereof to transmit the generated initial code S, depending on the capabilities of the visual display screen and any pre-configuration related to the IoT device 102. In some implementations, the light source may be one or more LEDs that emit the modulated light signal the personal electronic device 122 to transmit the generated initial code S. Specifically, the one or more LEDs can emit the modulated light signal with different light colors, different emitting time-durations, different emitting internals, or the combination thereof, depending on the capabilities of the one or more LEDs.

In some implementations, the modulated light signal may be emitted in a form of an optical communications frame. For example, the optical communications frame includes a frame header indicating a demodulation method of the frame and a frame body carrying the initial code S. For a source of visible light, for example, the modulated light signal may be emitted in a form of a VLC frame. VLC is a data communications variant which uses visible light between 400 and 800 terahertz (780-375 nm).

At step 508, the personal electronic device 122 demodulates the modulated light signal to retrieve the initial code S.

In some implementations, the personal electronic device 122 performs image or light demodulation analysis and retrieves the initial code S, using its light receiving component, such as a camera, light sensor or any other suitable device.

In some implementations, the personal electronic device 122 receives the modulated light signal in the form of the optical communications frame including a frame header and a frame body. Accordingly, the personal electronic device 122 retrieves a demodulation or decoding method of the frame from the frame header, and then retrieves the initial code S from the frame body using the demodulation or decoding method.

In some implementations, the personal electronic device 122 receives, detects, or measures the modulated light signal when: a second software application is loaded and initiated, the personal electronic device 122 detects a suitably modulated light signal, or the personal electronic device 122 receives a separate signal from the IoT device 102 indicating that the modulated light signal is going to be or is being transmitted by the IoT device, i.e., the personal electronic device receives a triggering signal from the IoT device 102.

In some implementations, the personal electronic device 122 and the IoT device 102 can be held close together to prevent the modulated light signal from impinging on anything other than the personal electronic device 122. In some implementations, one of the personal electronic device 122 or the IoT device 102 can include an optional shroud or other light-blocking structure to prevent most of the modulated light signal from being emitted to anything other than the personal electronic device 122.

It is understood that the modulated light signal may be invisible to human eyes, thus the user or nearby persons might not even be aware that the personal electronic device 122 and the IoT device 102 are communicating via light. Alternatively, even if the modulated light signal is visible to human eyes, such as VLC, the data included in the modulated light signal is still not detectable to humans. As a result, the initial code S may be transmitted in a secure and economical way.

At step 510, the IoT device 102 derives a security key K for security protection from the initial code S. As used herein, the singular forms "a," "an," and "the" are intended to include the plural forms as well, unless the context clearly indicates otherwise. It is expressly contemplated that any number of security keys may be derived from the initial code S. For example, alternate configurations are contemplated by this disclosure, e.g., where two security keys K1 and K2 are derived from the initial code S, the security key K1 can be used by the IoT device 102 for communication with the IoT gateway 112 or the IoT server 114, while the security key K2 can be used by the IoT device 102 for communication with the personal electronic device 122.

In some implementations, the security key K may be only used for the IoT communication initiation process.

In some implementations, the security key K is a one-time key that is only valid for one time use by the IoT communication initiation process. For each time the IoT device 102 performs (or attempts to perform) an IoT communication initiation process, a new security key K is generated. As a result, an eavesdropper cannot use a previously obtained security key K for a subsequent initiation process operation. In some implementations, each security key K may further include a valid time-to-live window which may be pre-configured. Once the valid time-to-live window has elapsed, the security key K becomes invalid. Thus a new security key K is needed to re-setup IoT communication for the IoT system due to the expiration of a old security key K.

The derived security key K can be the same size or a different size than the initial code S, for example, the initial code S can comprise 256 bits, while the derived security key K can comprise 128 bits.

At step 512, the personal electronic device 122 derives the same security key K from the initial code S using the same procedure as the IoT device 102 uses. It is expressly contemplated that any number of security keys may be derived from the initial code S, corresponding to the same operation on the IoT device 102.

At step 514, the personal electronic device 122 sends an add request to the IoT server 114 for adding an IoT device, and the derived security key K is included in the add request. In another example, the add request may include a device identifier of the IoT device 102 and the derived security key K.

It is expressly contemplated that the personal electronic device 122 may execute a second software application to implement parts or all or steps 508, 512 and 514, where the second software application is configured to perform a part of an IoT communication initiation process.

At step 516, the IoT server 114 relays the add request including the security key K to the IoT gateway 112 in order to indicate discovery of an IoT device.

At step 518, in response to the add request, the IoT gateway 112 starts discovery mode and stores the security key K.

At step 520, the IoT device 102 sends to the IoT gateway 112 a join request for joining or registering with the IoT system. The join request carries a first message authentication code (MAC) which is a calculated short piece of information used to protect the integrity and authenticity of the join request message. In this example, before sending the join request message, the IoT device 102 runs a calculation through a MAC algorithm to produce the first MAC. For example, the MAC algorithm, sometimes called a keyed (cryptographic) hash function, accepts as input the security key K and the join request message to be authenticated, and outputs the first MAC (sometimes known as a first MAC tag).

It is also understood that in addition to being an integrity key, the security key K can be further used as an encryption key to encrypt the join request message at the same time.

At step 522, the IoT gateway 112 receives the join request and retrieves the first MAC. The IoT gateway 112 then runs the same calculation as the IoT device 102 runs, through the same MAC algorithm using the same security key K, producing a second MAC. The IoT gateway 112 then compares the first MAC to the second MAC in a verification process. If they are identical, the IoT gateway 112 considers that the join request message is authentic and the integrity of the join request message is verified, where the join request message has not been altered or tampered with during transmission. After a successful authentication, the IoT gateway 112 may process the join request from the IoT device 102.

It is expressly understood that if the integrity and authenticity of the join request message is not verified, subsequent steps may be omitted and the initiation process may be terminated.

At step 524, after the successful authentication by the IoT gateway 112, the IoT gateway 112 returns a join response (including a third MAC) to the IoT device 102. The third MAC is calculated by the IoT gateway 112 using the security key K with the join response message to be authenticated. In some implementations, the join response further carries a registration indication that indicates a successful or failed registration with the IoT system for the IoT device 102.

At step 526, after receiving the join response message, the IoT device 102 performs the same calculation and calculates a fourth MAC using the security key K. The IoT device 102 then compares the calculated fourth MAC with the received third MAC. If they are identical, then a mutual authentication between the IoT device 102 and the IoT gateway 112 is passed. In some implementations, the IoT device 102 then retrieves the registration indication from the join response. The IoT communication initiation process may be finished.

It is expressly contemplated that the IoT device 102 may execute the first software application to implement parts or all of steps 502-506, 510, 520 and 526, where the first software application is configured to perform a part of an IoT communication initiation process.

After receiving a success registration indication, the IoT device 102 may further exchange information with the IoT system. For example, the IoT device 102 may transmit its sensor data to the IoT server 114 and receive control instructions from the IoT server 114 or the IoT gateway 112. In some implementations, the IoT device 102 may continue to use the security key K for subsequent communication with the IoT system. In some implementations, the IoT device 102 may derive one or more new security keys from the security key K and use the one or more new security keys for subsequent communication with the IoT system. For example, the one or more new security keys include a new integrity key, a new encryption key, or a combination thereof.

By transmitting the initial code S from the IoT device to the personal electronic device using a modulated light signal, no additional complex hardware is required for the IoT device or the personal electronic device, thereby establishing IoT communication for the IoT device in an economical and efficient way. In addition, as the initial code being transferred from the IoT device to the personal electronic device is not wirelessly transmitted via electromagnetic waves, eavesdroppers will have a very hard time obtaining the code exchanged between the IoT device and the personal electronic device, thereby establishing IoT communication for the IoT device in a secure way based on the exchanged code. In some embodiments, the IoT communication initiation process can be initiated via a button-press on the IoT device. No complex equipments or complicated method steps are required and thus the IoT communication initiation process is easy for an end-user to operate.

Figure 6:
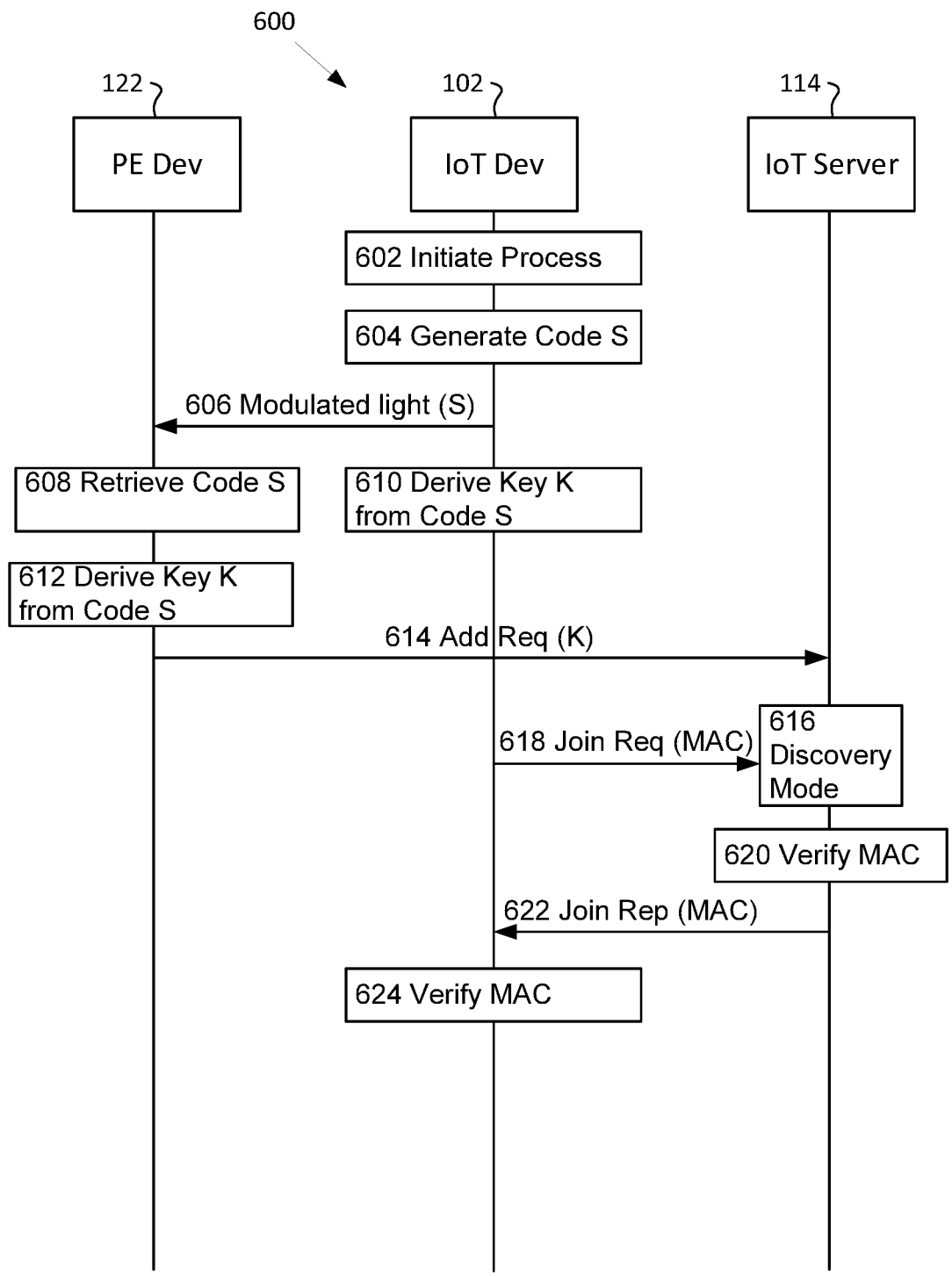
FIG. 6 is a flow diagram of another embodiment of a method for providing a key for IoT communication.

FIG. 6 is a flow diagram of another embodiment of a method 600 for providing a key for IoT communication. As an option, the embodiment method 600 may be implemented in the context of in the IoT system 200 as illustrated in FIG. 2. The embodiment shown in FIG. 6 is substantially similar to the embodiment shown in FIG. 5. The main difference between the embodiment of FIG. 6 and the embodiment of FIG. 5 lies in that the IoT gateway 112 is omitted and the IoT server 114 instead performs related operations. With regard to other steps of the embodiment of FIG. 6, reference can be made to the above-mentioned embodiment of FIG. 5, with their combination and modification falling within the scope of the present disclosure.

Figure 7:
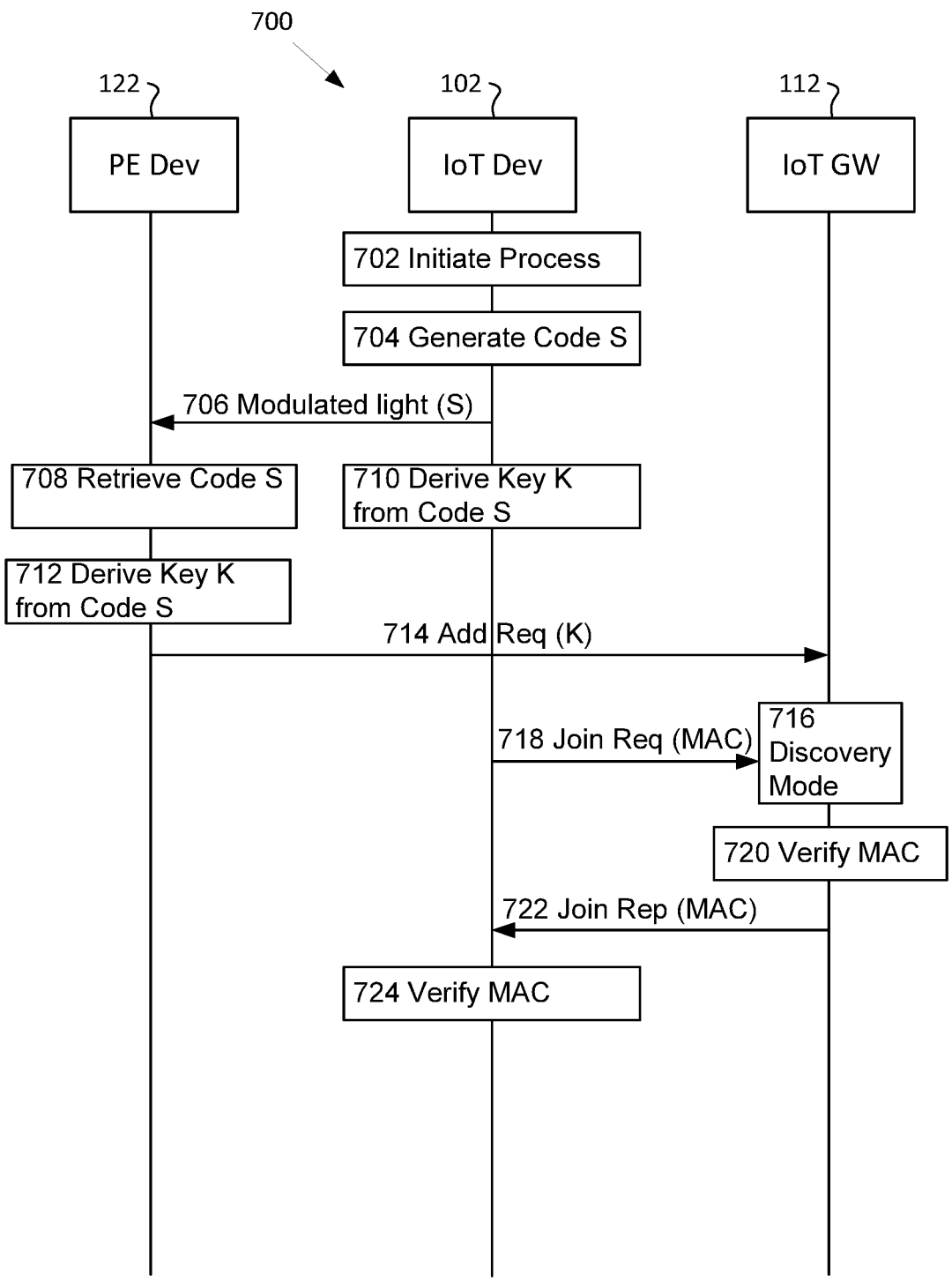
FIG. 7 is a flow diagram of another embodiment of a method for providing a key for IoT communication.

FIG. 7 is a flow diagram of another embodiment of a method 700 for providing a key for IoT communication As an option, the embodiment method 700 may be implemented in the context of in the IoT system 300 as illustrated in FIG. 3. The embodiment shown in FIG. 7 is substantially similar to the embodiment shown in FIG. 5. The main difference between the embodiment of FIG. 7 and the embodiment of FIG. 5 lies in that the IoT server 114 is omitted and the IoT gateway 112 instead performs related operations. With regard to other steps of the embodiment of FIG. 7, reference can be made to the above-mentioned embodiment of FIG. 5, with their combination and modification falling within the scope of the present disclosure.

Figure 8:
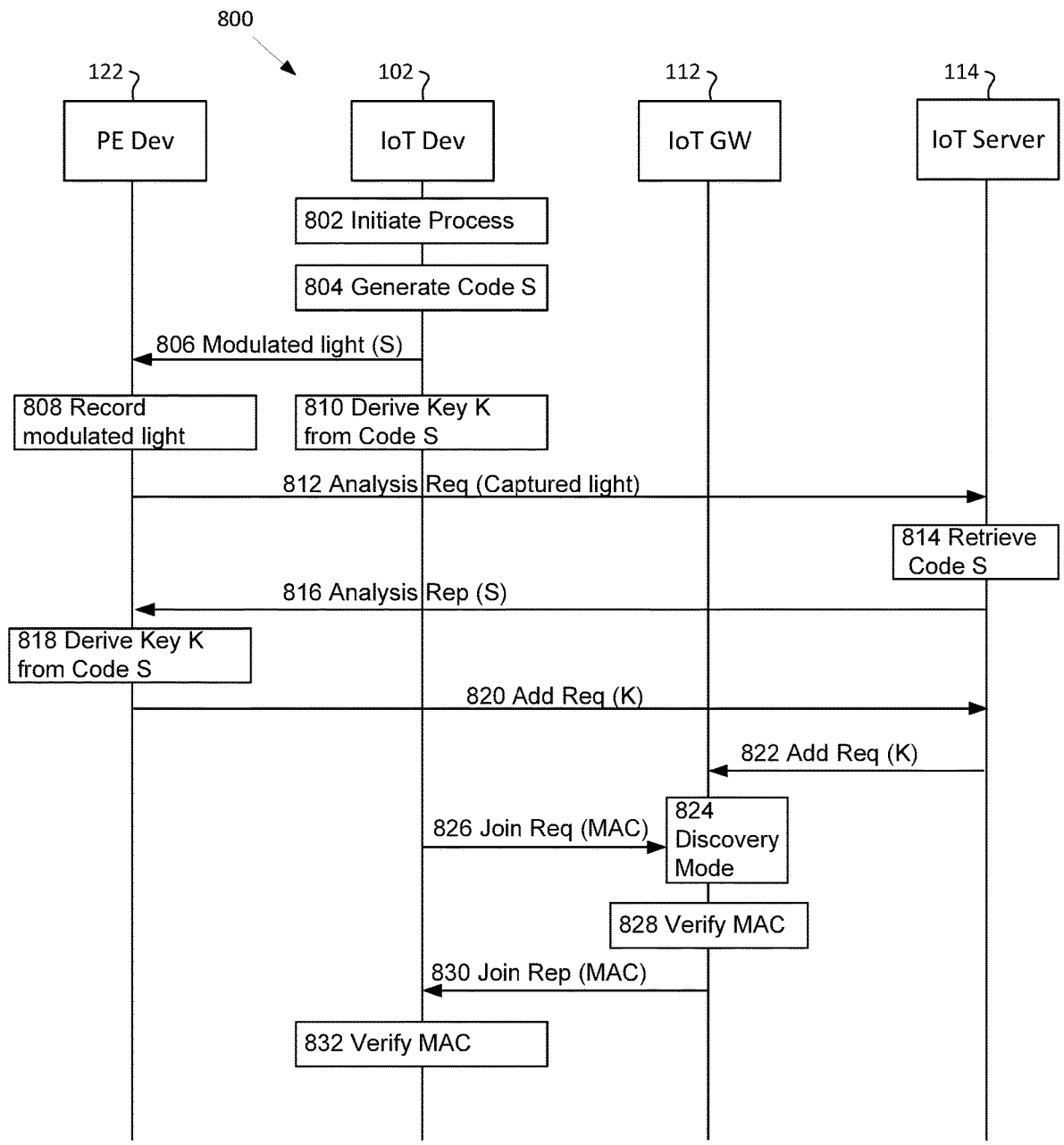
FIG. 8 is a flow diagram of another embodiment of a method for providing a key for IoT communication.

FIG. 8 is a flow diagram of another embodiment of a method 800 for providing a key for IoT communication. As an option, the embodiment method 800 may be implemented in the context of the IoT system 100 as illustrated in FIG. 1. The main difference between the embodiment of FIG. 8 and the embodiment of FIG. 5 lies in the personal electronic device 122 recording the modulated light signal and sending the recorded material to an external server for light signal demodulation analysis.

Steps 802-806 are substantially similar to steps 502-506 of the embodiment shown in FIG. 5. Reference can be made to the embodiment of FIG. 5 for the sake of conciseness.

At step 808, the personal electronic device 122 records the modulated light signal, e.g., records as a video recording, for example.

Step 810 is substantially similar to the step 510 of the embodiment shown in FIG. 5. Reference can be made to the embodiment of FIG. 5 for the sake of conciseness.

At step 812, the personal electronic device 122 sends the captured light signal to the IoT server 114 through an analysis request.

In some implementations, the personal electronic device 122 may send the recorded material to any other external server in or outside the IoT system, other than the IoT server 114, with the external server performing the light signal demodulation analysis and returning the retrieved initial code S.

At step 814, the IoT server 114 demodulates or decodes the captured light signal and retrieves the initial code S.

At step 816, the IoT server 114 returns the initial code S to the personal electronic device 122 through an analysis response.

It is understood that alternate configurations are contemplated by this disclosure, e.g., where after retrieving the initial code S, the IoT server 114 derives the same security key K from the initial code S using the same procedure as the IoT device 102 uses, and then sends the security key K to the IoT gateway 112. If the IoT server 114 derives and sends the security key K, there is no need to perform steps 816-822 and then the method may skip to step 824.

Steps 818-832 are substantially similar to steps 512-526 of the embodiment shown in FIG. 5. Reference can be made to the embodiment of FIG. 5 for the sake of conciseness.

As the demodulation or decoding operation can be performed by an external server other than the personal electronic device 122, the computing requirement for the personal electronic device 122 can be lowered, thereby establishing IoT communication for the IoT device in a simplified way.

Figure 9:
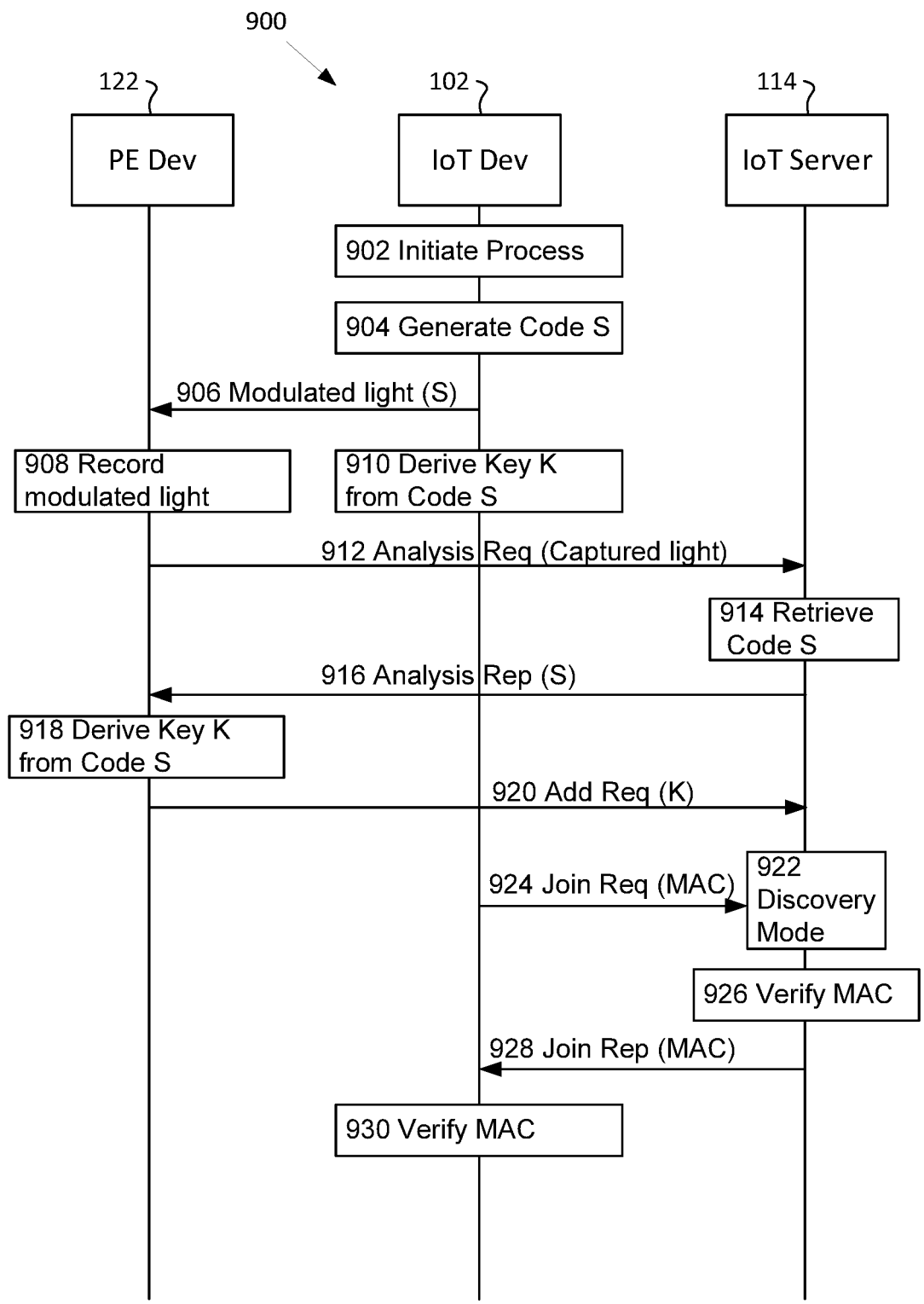
FIG. 9 is a flow diagram of another embodiment of a method for providing a key for IoT communication.

FIG. 9 is a flow diagram of another embodiment of a method 900 for providing a key for IoT communication. As an option, the embodiment method 900 may be implemented in the context of in the IoT system 200 as illustrated in FIG. 2. The embodiment shown in FIG. 9 is substantially similar to the embodiment shown in FIG. 8. The main difference between the embodiment of FIG. 9 and the embodiment of FIG. 8 lies in that the IoT gateway 112 is omitted and the IoT server 114 instead performs related operations. With regard to other steps of the embodiment of FIG. 9, reference can be made to the above-mentioned embodiment of FIG. 8, with their combination and modification falling within the scope of the present disclosure.

Figure 10:
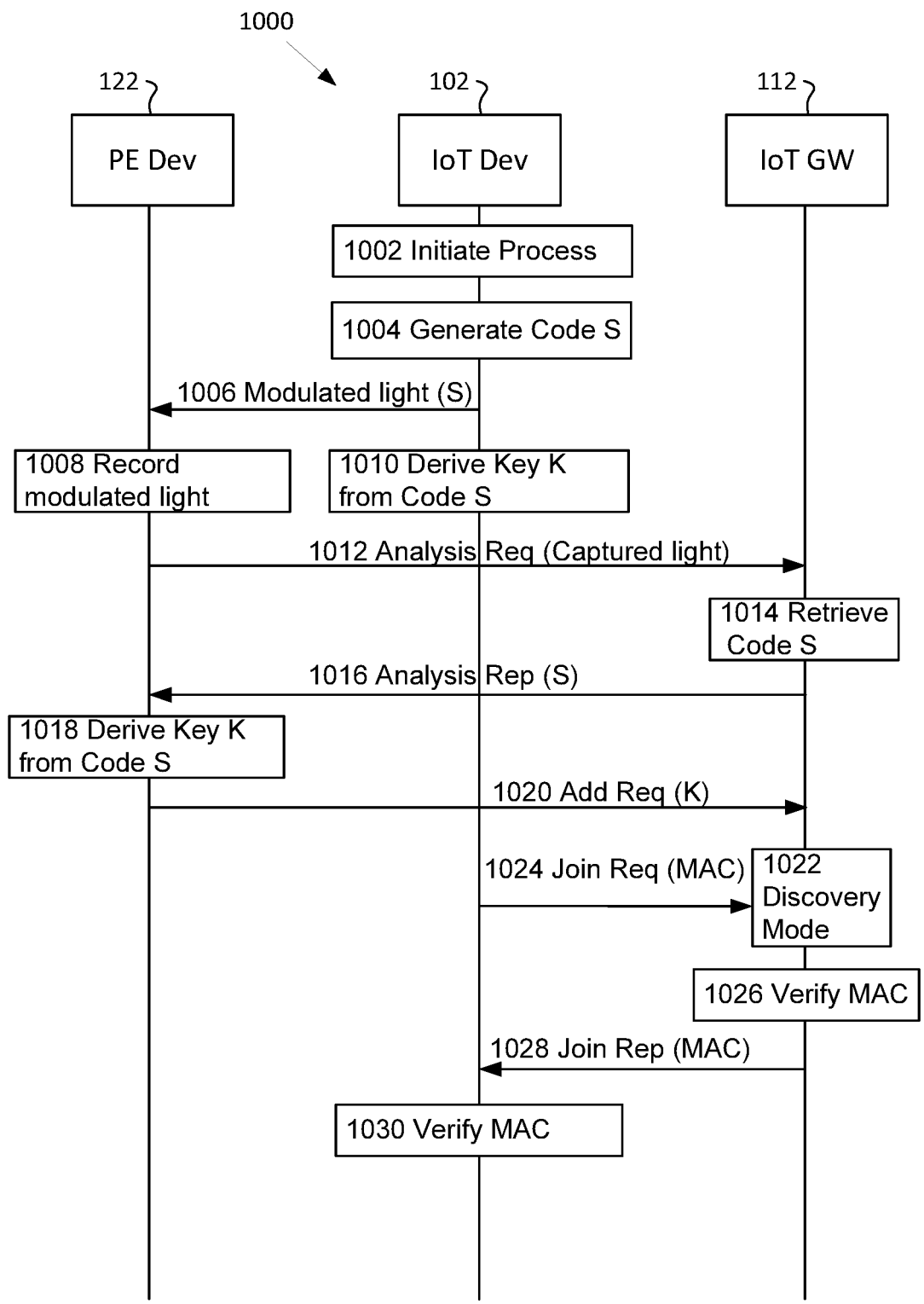
FIG. 10 is a flow diagram of another embodiment of a method for providing a key for IoT communication.

FIG. 10 is a flow diagram of another embodiment of a method 1000 for providing a key for IoT communication As an option, the embodiment method 1000 may be implemented in the context of in the IoT system 300 as illustrated in FIG. 3. The embodiment shown in FIG. 10 is substantially similar to the embodiment shown in FIG. 8. The main difference between the embodiment of FIG. 10 and the embodiment of FIG. 5 lies in that the IoT server 114 is omitted and the IoT gateway 112 instead performs related operations. With regard to other steps of the embodiment of FIG. 10, reference can be made to the above-mentioned embodiment of FIG. 8, with their combination and modification falling within the scope of the present disclosure.

Figure 11:
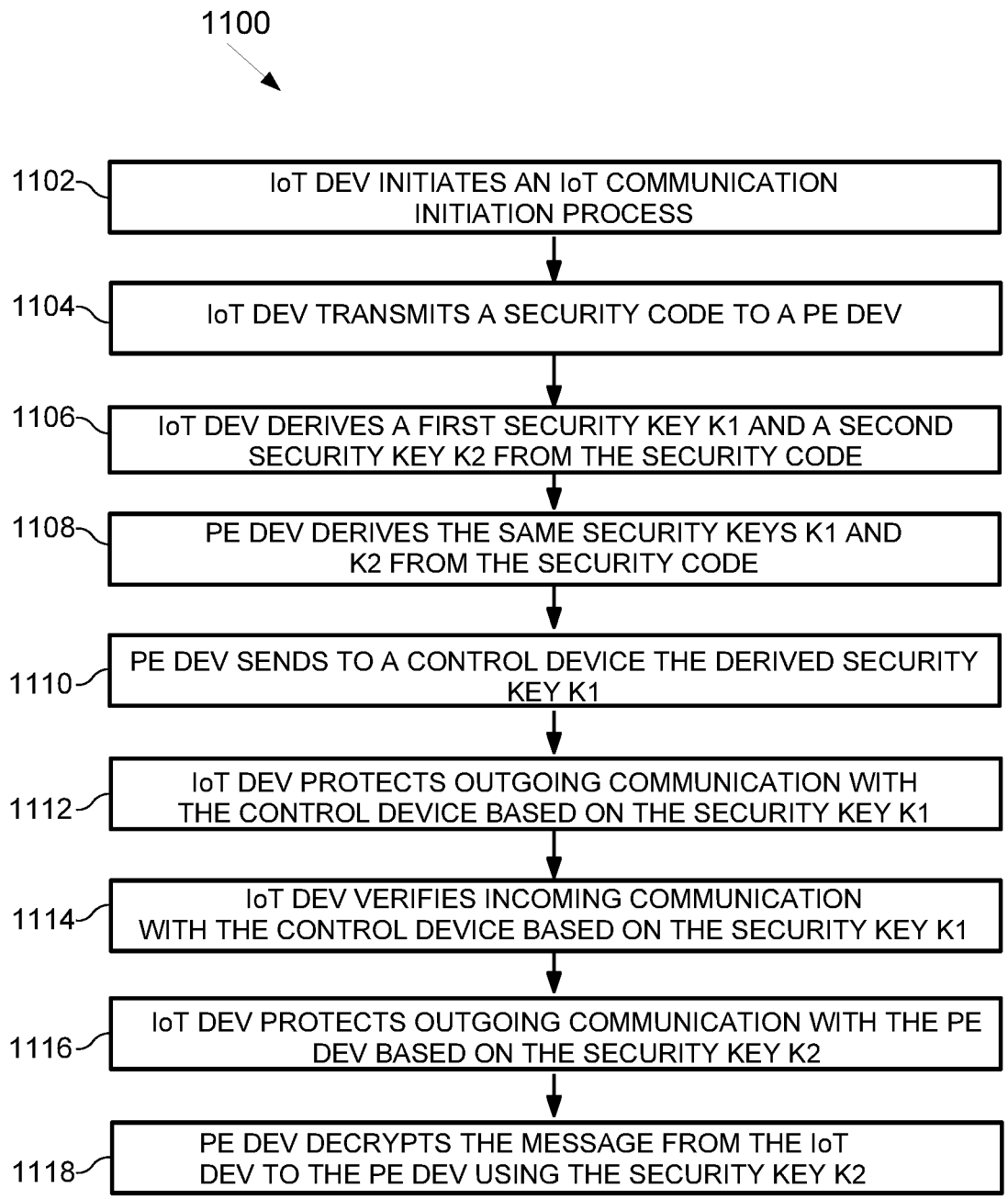
FIG. 11 is a flow diagram of another embodiment of a method for providing a key for IoT communication.

FIG. 11 is a flow diagram of another embodiment of a method 1100 for providing a key for IoT communication. The embodiment method 1100 may be implemented in the context of various embodiments of the disclosed IoT systems.

At step 1102, an IoT device, such as the IoT device 102, initiates an IoT communication initiation process in an IoT system.

At step 1104, the IoT device transmits a security code to a personal electronic device, such as the personal electronic device 122. For example, the security code comprises a random number, a pseudorandom number, a number generated in other suitable ways, or a root key.

In some implementations, the IoT device establishes a secured communication channel with the personal electronic device to transmit the security code to the personal electronic device. For example, the secured communication channel may be established by using various communication protocols, such as ZigBee, Z-Wave, Bluetooth, Bluetooth Low Energy, light communication, VLC or the like.

At step 1106, the IoT device derives a first security key K1 and a second security key K2 from the security code. It is expressly contemplated that any number of security keys may be derived from the security code.

At step 1108, the personal electronic device derives the same security keys K1 and k2 from the security code as the IoT device, using the same procedure.

At step 1110, the personal electronic device sends to a control device the derived security key K1. The control device then may use the security key K1 to verify integrity of a message from the IoT device to the control device, and optionally to decrypt the message if the message is encrypted. The control device, for example, includes an IoT gateway, an IoT server or the combination thereof.

At step 1112, the IoT device protects outgoing communication with the control device based on the security key K1.

For example, the IoT device protects the integrity of the message from the IoT device to the control device using the security key K1. In another example, the IoT device protects integrity and confidentiality of the message from the IoT device to the control device using the security key K1.

Optionally, at step 1114, the IoT device verifies incoming communication with the control device based on the security key K1. It is understood that a mutual authentication between the IoT device and the personal electronic device is optional and in some embodiments only a single side authentication may be required for the IoT communication initiation process.

At step 1116, the IoT device protects outgoing communication with the personal electronic device based on the security key K2.

For example, the IoT device protects confidentiality of a message from the IoT device to the personal electronic device based on the security key K2. In another example, the IoT device protects integrity and confidentiality of a message from the IoT device to the personal electronic device based on the security key K2.

At step 1118, the personal electronic device decrypts the message from the IoT device to the personal electronic device using the security key K2. Optionally, the personal electronic device further verifies the integrity of the the message from the IoT device to the personal electronic device using the security key K2.

By deriving two different security keys K1 and K2 for security protection, the security key K1 can be used by the IoT device for communication with the control device, while the security key K2 can be used by the IoT device for communication with the personal electronic device. Thus the control device, knowing only the security keys K1, cannot obtain or intercept the information exchanged between the IoT device and the personal electronic device that are protected by the security key K2, thereby improving security protection level for IoT communication between the IoT device and the personal electronic device.

Figure 12:
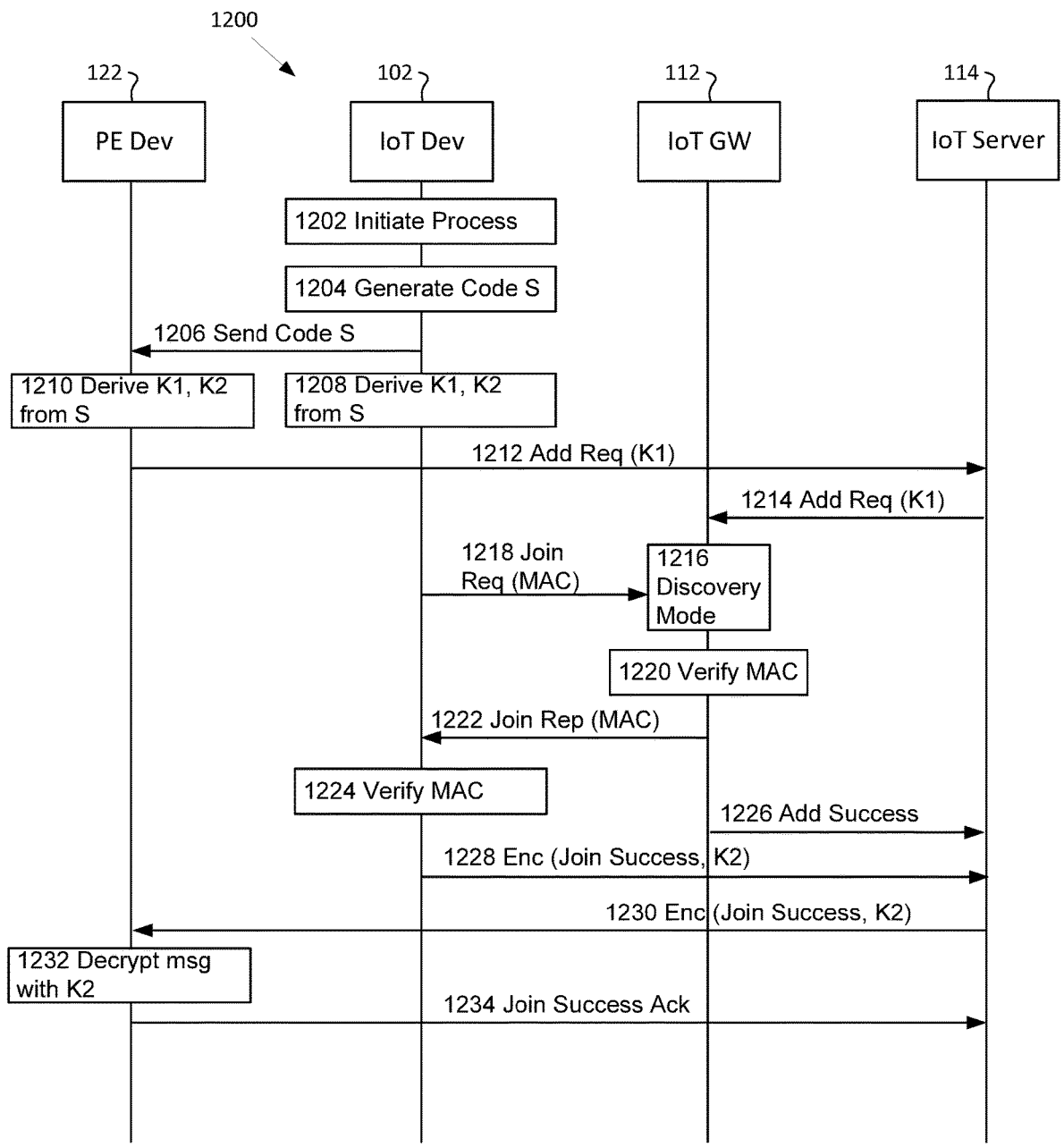
FIG. 12 is a flow diagram of another embodiment of a method for providing a key for IoT communication.

FIG. 12 is a flow diagram of another embodiment of a method 1200 for providing a key for IoT communication. As an option, the embodiment method 1200 may be implemented in the context of the IoT system 100 as illustrated in FIG. 1.

At step 1202, an IoT device, such as the IoT device 102, initiates an IoT communication initiation or setup process in an IoT system, such as the IoT system 100.

In some implementations, the IoT device 102 may initiate in response to an input caused by pressing a button or combination of buttons of the IoT device 102. Alternatively, the input may be caused by manipulating some manner of suitable input device. In some implementations, the IoT device 102 may initiate when it attempts to perform communications or interact with an external device or network.

At step 1204, the IoT device 102 generates an initial code S, i.e., a security code, when the IoT communication initiation process is initiated. The initial code S, for example, comprises a random number, a pseudorandom number, a number generated in other suitable ways, or a root key.

In some implementations, the initial code S is inputted by a user. In some implementations, the initial code S is pre-stored within the IoT device 102. In some implementations, the initial code S is transferred to the IoT device 102 from an external device, such as a memory device or other external device that is coupled to the IoT device 102. In some implementations, a first software application loaded on the IoT device 102 generates the initial code S.

In some implementations, the initial code S is a one-time code that is only valid for one time of the IoT communication initiation process. For each time the IoT device 102 performs or attempts to perform an IoT communication initiation process, a new initial code S is generated. As a result, an eavesdropper cannot use a previously obtained initial code S for a subsequent initiation process operation. In some implementations, each initial code S may further include a valid time-to-live window which may be pre-configured. Once the valid time-to-live window has elapsed, the initial code S becomes invalid. Thus a new initial code S is needed to re-setup IoT communication for the IoT system due to the expiration of a old initial code S.

At step 1206, the IoT device 102 establishes a secured communication channel with the personal electronic device, such as the personal electronic device 122, and then transmits the generated initial code S to the personal electronic device 122. For example, the secured communication channel may be established by using various communication protocols, such as ZigBee, Z-Wave, Bluetooth, Bluetooth Low Energy, light communication or the like. With respect to implementations of light communication, reference can be made to step 506 of embodiment of FIG. 5.

At step 1208, the IoT device 102 derives two security keys K1 and K2 for security protection from the initial code S. For example, the security key K1 can be used by the IoT device 102 for communication with the IoT gateway 112 or the IoT server 114, while the security key K2 can be used by the IoT device 102 for communication with the personal electronic device 122. It is expressly contemplated that more than two security keys may be derived from the initial code S.

In some implementations, the security key K1 may be used by the IoT device 102 for communication with the IoT gateway 112 or the IoT server 114, as a shared integrity key. As an example, the security key K1 may be only used for the IoT communication initiation process.

In some implementations, the security key K1 is a one-time key that is only valid for one time of the IoT communication initiation process. For each time the IoT device 102 performs or attempts to perform an IoT communication initiation process, a new security key K1 is generated. As a result, an eavesdropper cannot use a previously found out security key K1 for a subsequent initiation process operation. In some implementations, each security key K1 may further includes a valid time-to-live window which may be pre-configured. Once the valid time-to-live window has elapsed, the corresponding security key K1 becomes invalid. Thus a new security key K1 is needed to re-setup IoT communication for the IoT system due to the expiration of an old security key K1.

In some implementations, the security key K2 can be used as an encryption key by the IoT device 102 for subsequent communication with the personal electronic device 122 over an un-secured channel, e.g., TLS or application encryption via a gateway or internet.

In some implementations, the derived security keys K1 and K2 can be the same size or a different size than the initial code S, for example, the initial code S can comprise 256 bits, while the derived security keys K1 and K2 can comprise 128 bits.

At step 1210, the personal electronic device 122 derives the same two security keys K1 and K2 from the initial code S using the same procedure as the IoT device 102 uses.

At step 1212, the personal electronic device 122 sends an add request to the IoT server 114 for adding an IoT device, and the derived security key K1 is included in the add request. In another example, the add request may include a device identifier of the IoT device 102 and the derived security key K1.

At step 1214, the IoT server 114 relays the add request (including the security key K1) to the IoT gateway 112 in order to indicate discovery of an IoT device.

At step 1216, in response to the add request, the IoT gateway 112 starts discovery mode and stores the security key K1.

At step 1218, the IoT device 102 sends to the IoT gateway 112 a join request for joining or registering with the IoT system. The join request carries a first message authentication code (MAC) which is a calculated short piece of information used to protect the integrity and authenticity of the join request message. In this example, before sending the join request message, the IoT device 102 runs a calculation through a MAC algorithm to produce the first MAC. For example, the MAC algorithm, sometimes called a keyed (cryptographic) hash function, accepts as input the security key K1 and the join request message to be authenticated, and outputs the first MAC (sometimes known as a first MAC tag).

It is also understood that in addition to being an integrity key, the security key K1 can be further used as an encryption key to encrypt the join request message at the same time.

At step 1220, the IoT gateway 112 receives the join request and retrieves the first MAC. The IoT gateway 112 then runs the same calculation as the IoT device 102 runs, through the same MAC algorithm using the same security key K1, producing a second MAC. The IoT gateway 112 then compares the first MAC to the second MAC. If they are identical, the IoT gateway 112 considers the join request message to be authentic and the integrity of the join request message is therefore verified, where the join request message has not been altered or tampered with during transmission. After a successful authentication, the IoT gateway 112 may process the join request from the IoT device 102.

It is expressly understood that if the integrity and authenticity of the join request message is not verified, subsequent steps may be omitted and the initiation process may be terminated.

At step 1222, after the successful authentication by the IoT gateway 112, the IoT gateway 112 returns a join response including a third MAC to the IoT device 102. The third MAC is calculated by the IoT gateway 112 using the same security key K1 with the join response message to be authenticated. In some implementations, the join response further carries a registration indication that indicates a successful or failed registration with the IoT system for the IoT device 102.

At step 1224, after receiving the join response message, the IoT device 102 performs the same calculation and calculates a fourth MAC using the same security key K1. The IoT device 102 then compares the calculated fourth MAC with the received third MAC. If they are identical, then a mutual authentication between the IoT device 102 and the IoT gateway 112 is passed. In some implementations, the IoT device 102 then retrieves the registration indication from the join response.

Optionally, at step 1226, the IoT gateway 112 sends an add success message to the IoT server 114 to inform a successful adding operation.

At step 1228, the IoT device 102 uses the security key K2 to encrypt a join success message, and then sends the encrypted message to the IoT server 114 through the IoT gateway 112.

It is also understood that in addition to being an encryption key, the security key K2 can be further used as an integrity key to protect the integrity of the join request message at the same time.

At step 1230, the IoT server 114 relays the encrypted message from the IoT device 102 to the personal electronic device 122. As the join success message is encrypted with the security key K2 different from the security key K1 known by the IoT server 114 or the IoT gateway 112, the IoT server 114 cannot obtain the information exchanged between the IoT device 102 and the personal electronic device 122.

At step 1232, the personal electronic device 122 uses stored security key K2 to decrypt the encrypted join success message. If it can be successfully decrypted, the personal electronic device 122 sends a join success acknowledgement message to the IoT server 114 to indicate a completion of the joining process.

After a successful joining process, the IoT device 102 may further exchange information with the IoT server and the personal electronic device 122.

In some implementations, the IoT device 102 may use the security key K1 for subsequent communication with the IoT server 114 or the IoT gateway 112. In some implementations, the IoT device 102 may derive one or more new security keys from the security key K1 and use the one or more new security keys for subsequent communication with the IoT server 114 or the IoT gateway 112. For example, the one or more new security keys include a new integrity key, a new encryption key, or a combination thereof.

In some implementations, the IoT device 102 may use the security key K2 for subsequent communication with the personal electronic device 122.

It is expressly contemplated that the IoT device 102 may execute the first software application to implement parts or all of steps 1202-1208, 1218, 1224 and 1228, where the first software application is configured to perform a part of an IoT communication initiation process.

It is expressly contemplated that the personal electronic device 122 may execute a second software application to implement part or all of steps 1210-1212 and 1232-1234, where the second software application is configured to perform a part of an IoT communication initiation process.

By deriving two different security keys K1 and K2 for security protection, the security key K1 can be used by the IoT device 102 for communication with the IoT gateway 112 or the IoT server 114, while the security key K2 can be used by the IoT device 102 for communication with the personal electronic device 122. Thus the IoT server 114 or the IoT gateway 112, knowing only the security keys K1, cannot obtain the information exchanged between the IoT device 102 and the personal electronic device 122 that are protected by the security key K2, thereby improving security protection level for IoT communication between the IoT device 102 and the personal electronic device 122.

Figure 13:
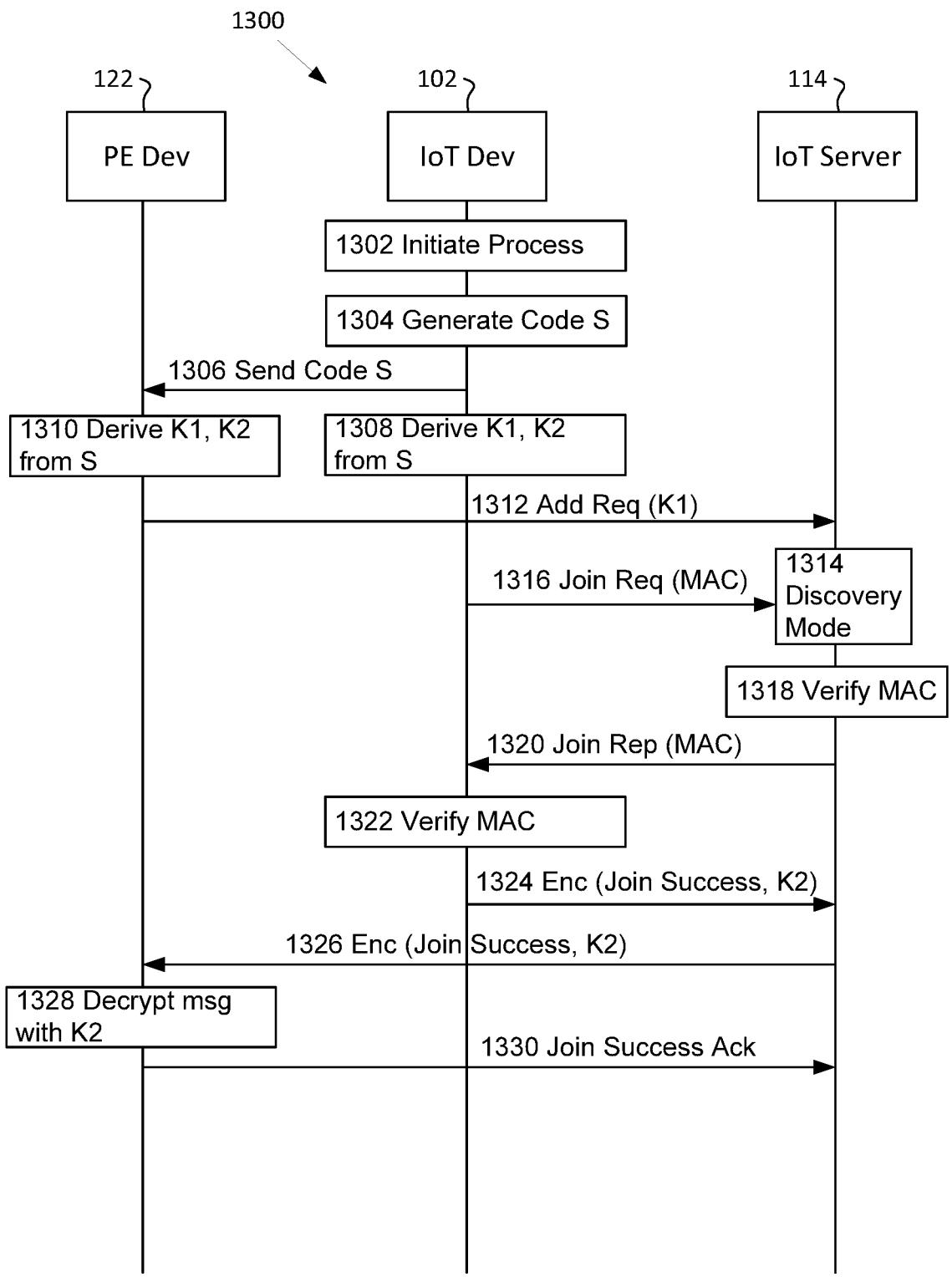
FIG. 13 is a flow diagram of another embodiment of a method for providing a key for IoT communication.

FIG. 13 is a flow diagram of another embodiment of a method 1300 for providing a key for IoT communication. As an option, the embodiment method 1300 may be implemented in the context of in the IoT system 200 as illustrated in FIG. 2. The embodiment shown in FIG. 13 is substantially similar to the embodiment shown in FIG. 12. The main difference between the embodiment of FIG. 13 and the embodiment of FIG. 12 lies in that the IoT gateway 112 is omitted and the IoT server 114 instead performs related operations. With regard to other steps of the embodiment of FIG. 13, reference can be made to the above-mentioned embodiment of FIG. 12, with their combination and modification falling within the scope of the present disclosure.

Figure 14:
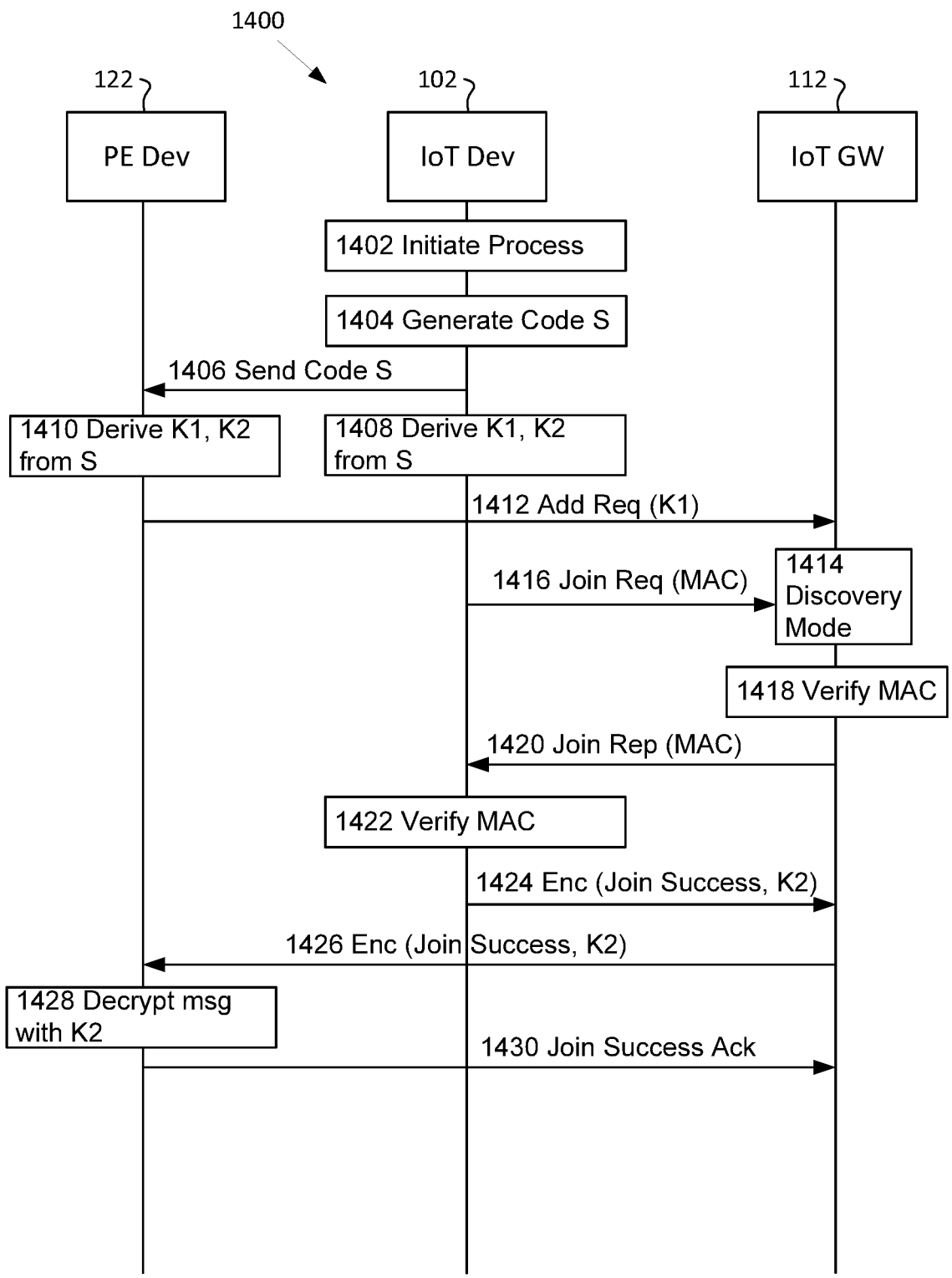
FIG. 14 is a flow diagram of yet another embodiment of a method for providing a key for IoT communication.

FIG. 14 is a flow diagram of yet another embodiment of a method 1400 for providing a key for IoT communication. As an option, the embodiment method 1400 may be implemented in the context of in the IoT system 300 as illustrated in FIG. 3. The embodiment shown in FIG. 14 is substantially similar to the embodiment shown in FIG. 12. The main difference between the embodiment of FIG. 14 and the embodiment of FIG. 12 lies in that the IoT server 114 is omitted and the IoT gateway 112 instead performs related operations. With regard to other steps of the embodiment of FIG. 14, reference can be made to the above-mentioned embodiment of FIG. 12, with their combination and modification falling within the scope of the present disclosure.

Figure 15:
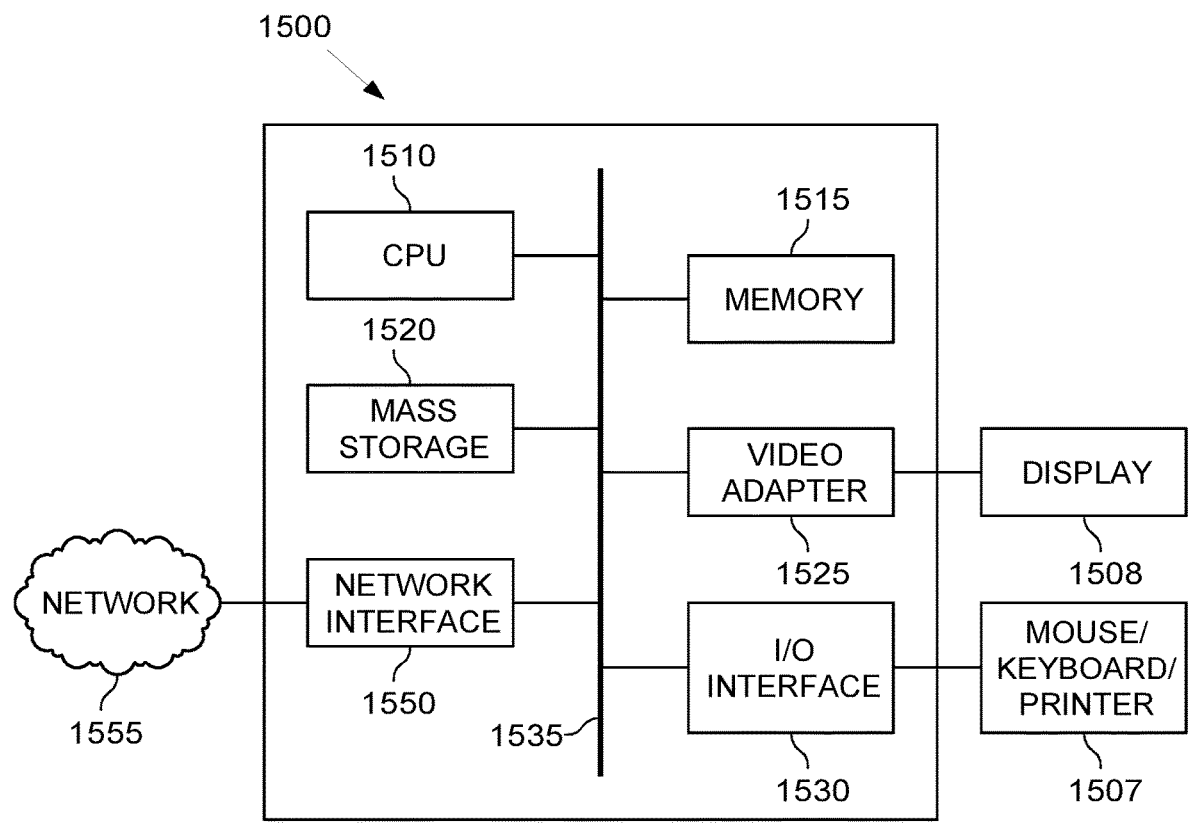
FIG. 15 is a block diagram of an embodiment processing system for performing methods described herein.

FIG. 15 is a block diagram of a processing system 1500 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1500 may be equipped with one or more input/output devices, such as a speaker, microphone, mouse 1507, touchscreen, keypad, keyboard 1507, printer 1507, display 1508, and the like. The processing system 1500 may include a central processing unit (CPU) 1510, memory 1515, a mass storage device 1520, a video adapter 1525, and an I/O interface 1530 connected to a bus 1535. The processing system 1500 may optionally include one or more sensors.

The bus 1535 may be one or more of any type of several bus architectures including a memory bus or memory controller, a peripheral bus, video bus, or the like. The CPU 1510 may comprise any type of electronic data processor. The memory 1515 may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 1520 may comprise any type of non-transitory storage device configured to store data, programs, and other information and to make the data, programs, and other information accessible via the bus. The mass storage device 1520 may comprise, for example, one or more of a solid state drive, hard disk drive, a magnetic disk drive, an optical disk drive, or the like.

The video adapter 1525 and the I/O interface 1530 provide interfaces to couple external input and output devices to the processing system 1500. As illustrated, examples of input and output devices include the display 1508 coupled to the video adapter 1525 and the mouse/keyboard/printer 1507 coupled to the I/O interface 1530. Other devices may be coupled to the processing system 1500, and additional or fewer interface cards may be utilized. For example, a serial interface such as Universal Serial Bus (USB) (not shown) may be used to provide an interface for a printer.

The processing system 1500 also includes one or more network interfaces 1550, which may comprise wired links, such as an Ethernet cable or the like, and/or wireless links to access nodes or different networks. The network interface 1550 allows the processing unit to communicate with remote units via the networks. For example, the network interface 1550 may provide wireless communication via one or more transmitters/transmit antennas and one or more receivers/receive antennas. In another example, the network interface 1550 may provide light communication via one or more light emitting components (e.g., light bulb, LED) and one or more light receiving components (e.g., light sensor, camera). In an embodiment, the processing unit is coupled to a local-area network or a wide-area network for data processing and communications with remote devices, such as other processing units, the Internet, remote storage facilities, or the like.

Figure 16:
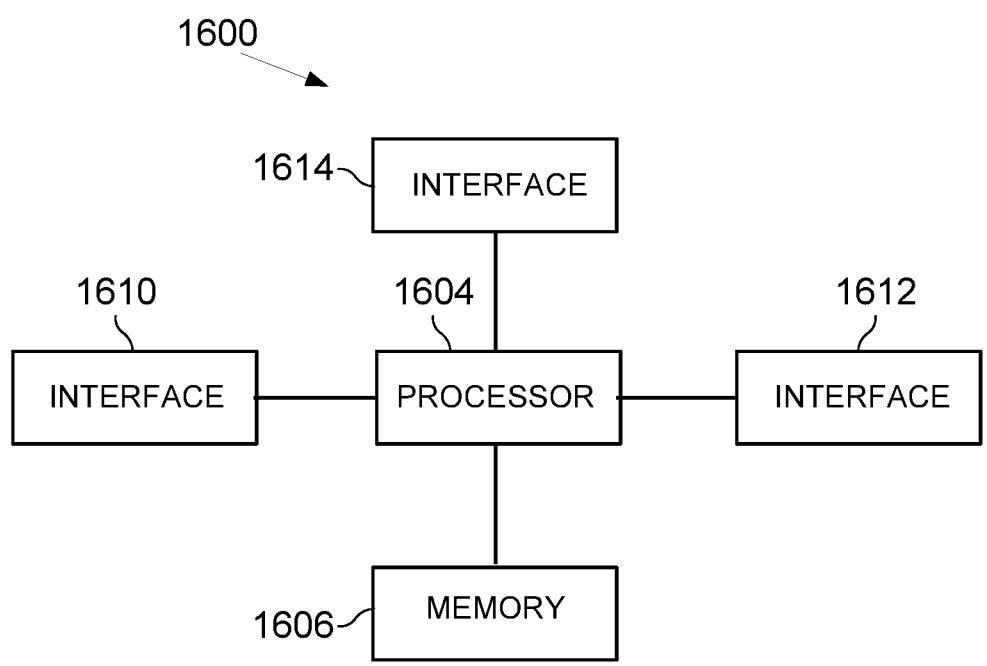
FIG. 16 is a block diagram of a communications device for performing methods described herein.

FIG. 16 is a block diagram of an embodiment of a communications device 1600, which may be equivalent to one or more devices discussed above. The communications device 1600 may include a processor 1604, a memory 1606, and a plurality of interfaces 1610, 1612, 1614, which may (or may not) be arranged as shown in FIG. 16. The processor 1604 may be any component capable of performing computations and/or other processing related tasks, and the memory 1606 may be any component capable of storing programming and/or instructions for the processor 1604. The interfaces 1610, 1612, 1614 may be any component or collection of components that allow the communications device 1600 to communicate with other devices.

Although a combination of features is shown in the illustrated examples, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for providing a key for internet of things (IoT) communication, comprising:
   modulating, by an IoT device, a light signal carrying a security code to generate a modulated light signal carrying the security code;
   transmitting, by the IoT device, the modulated light signal carrying the security code to a personal electronic device;
   deriving, by the IoT device, a security key from the security code; and
   performing, by the IoT device, authentication with a control device based on the security key and a message communicated from the personal electronic device to the control device, the control device being separate from the IoT device.

2. The method of claim 1, wherein the modulated light signal comprises a visible or non-visible light communication frame.

3. The method of claim 2, wherein the visible or non-visible light communication frame includes:
   a frame header indicating a demodulation method of the visible or non-visible light communication frame; and
   a frame body carrying the security code.

4. The method of claim 1, wherein the security code comprises a random number, a pseudorandom number or a root key.

5. The method of claim 1, wherein performing authentication with the control device comprises:
   obtaining a first message authentication code (MAC) of a message to be authenticated from the control device;
   calculating a second MAC based on the security key and the message to be authenticated; and
   determining whether the first MAC is identical to the second MAC.

6. The method of claim 1, wherein the message includes the security key and is communicated over a secure communications network that is separate from an IoT network of the IoT device.

7. An internet of things (IoT) device, comprising:
   a non-transitory memory storing instructions; and
   one or more processors in communication with the non-transitory memory, wherein the one or more processors execute the instructions to:
   modulate a light signal carrying a security code to generate a modulated light signal carrying the security code;

transmit the modulated light signal carrying the security code to a personal electronic device;
derive a security key from the security code; and
perform authentication with a control device based on the security key and a message communicated from the personal electronic device to the control device, the control device being separate from the IoT device.

8. The IoT device of claim 7, wherein the modulated light signal comprises a visible or non-visible light communication frame.

9. The IoT device of claim 8, wherein the message includes the security key and is communicated over a secure communications network that is separate from an IoT network of the IoT device.

10. The IoT device of claim 8, wherein the visible or non-visible light communication frame includes:
a frame header indicating a demodulation method of the visible or non-visible light communication frame; and
a frame body carrying the security code.

11. The IoT device of claim 7, wherein the security code comprises a random number, a pseudorandom number or a root key.

12. The IoT device of claim 7, wherein the one or more processors execute the instructions to perform authentication with the control device by executing instructions to:
obtain a first message authentication code (MAC) of a message to be authenticated from the control device;
calculate a second MAC based on the security key and the message to be authenticated; and
determine whether the first MAC is identical to the second MAC.

13. A method comprising:
receiving, by a personal electronic device, a modulated light signal carrying a security code from an internet of things (IoT) device;
deriving, by the personal electronic device, a security key from the security code; and
sending, by the personal electronic device, a message to a control device based on the security key, the control device separate from the IoT device.

14. The method of claim 13, wherein the modulated light signal comprises a visible or non-visible light communication frame.

15. The method of claim 14, wherein the visible or non-visible light communication frame includes:
a frame header indicating a demodulation method of the visible or non-visible light communication frame;
and a frame body carrying the security code.

16. The method of claim 13, wherein the message includes an add request for adding the IoT device to the control device, the message further including the security key and a device ID of the IoT device.

17. The method of claim 13, further comprising demodulating the modulated light signal to retrieve the security code.

18. The method of claim 13, further comprising:
recording, by the personal electronic device, the modulated light signal;
sending, by the personal electronic device, the recorded modulated light signal to an external device for demodulation; and
receiving, by the personal electronic device, the security code from the external device.

19. The method of claim 13, wherein the message includes the security key and is communicated over a secure communications network that is separate from an IoT network of the IoT device.

20. A personal electronic device comprising:
a non-transitory memory storing instructions; and
one or more processors in communication with the non-transitory memory, wherein the one or more processors execute the instructions to:
receive a modulated light signal carrying a security code from an internet of things (IoT) device;
derive a security key from the security code; and
send a message to a control device based on the security key, the control device separate from the IoT device.

21. The personal electronic device of claim 20, wherein the modulated light signal comprises a visible or non-visible light communication frame.

22. The personal electronic device of claim 21, wherein the visible or non-visible light communication frame includes:
a frame header indicating a demodulation method of the visible or non-visible light communication frame; and
a frame body carrying the security code.

23. The personal electronic device of claim 20, wherein the message includes an add request for adding the IoT device to the control device, the security key, and a device ID of the IoT device.

24. The personal electronic device of claim 20, wherein the one or more processors further execute the instructions to demodulate the modulated light signal to retrieve the security code.

25. The personal electronic device of claim 20, wherein the one or more processors further execute the instructions to:
record the modulated light signal;
send the recorded modulated light signal to an external device for demodulation; and
receive the security code from the external device.

26. The personal electronic device of claim 20, wherein the message includes the security key and is communicated over a secure communications network that is separate from an IoT network of the IoT device.

* * * * *